US009098623B2

(12) United States Patent
Berg et al.

(10) Patent No.: US 9,098,623 B2
(45) Date of Patent: *Aug. 4, 2015

(54) STATIC ANALYSIS OF VALIDATOR ROUTINES

(71) Applicant: International Business Machines Corporation, Armonk, NY (US)

(72) Inventors: Ryan Berg, Sudbury, MA (US); Marco Pistoia, Amawalk, NY (US); Takaaki Tateishi, Yamato (JP); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,489

(22) Filed: Oct. 28, 2013

(65) Prior Publication Data
US 2014/0053140 A1    Feb. 20, 2014

Related U.S. Application Data

(63) Continuation of application No. 13/109,170, filed on May 17, 2011, now Pat. No. 8,726,246.

(51) Int. Cl.
*G06F 9/44*      (2006.01)
*G06F 11/36*     (2006.01)
*G06F 9/45*      (2006.01)

(52) U.S. Cl.
CPC ............ *G06F 11/3612* (2013.01); *G06F 8/436* (2013.01); *G06F 11/3604* (2013.01)

(58) Field of Classification Search
CPC .................................................. G06F 11/3612

USPC ................................ 717/110–158; 714/37–39
See application file for complete search history.

(56) References Cited

U.S. PATENT DOCUMENTS

| 5,774,729 A * | 6/1998 | Carney et al. .................. 717/126 |
| 2002/0049659 A1* | 4/2002 | Johnson et al. .................. 705/37 |
| 2009/0013162 A1* | 1/2009 | Nandan et al. .................... 713/1 |
| 2010/0333201 A1* | 12/2010 | Haviv et al. ...................... 726/22 |
| 2011/0119654 A1* | 5/2011 | Miller et al. .................. 717/125 |

OTHER PUBLICATIONS

Gannon, Error Detection Using Path Testing and Static Analysis, IEEE Computer vol. 12 No. 8, pp. 26-31.*

(Continued)

*Primary Examiner* — Satish Rampuria
(74) *Attorney, Agent, or Firm* — Harrington & Smith; Louis J. Percello

(57) ABSTRACT

A method includes accessing a validator routine having an input string and one or more return points, each return point returning a return value having two possible values; finding the return points in the validator routine; for each of the return points, performing a backwards traversal from a return point through a code section and determining constraints on the input string based at least on one or both of the two possible return values for the return point; using the determined constraints for the input string, determining whether all of the return values returned from the one or more return points meet validation constraints; and outputting one or more indications of whether all of the returned values returned from the return points meet the validation constraints for the one or both of the two possible return values. Apparatus and computer program products are also disclosed.

14 Claims, 6 Drawing Sheets

(56) References Cited

OTHER PUBLICATIONS

Osterweil, A Strategy for Effective Integration of Verification and Testing Techniques, IP.com, Jul. 31, 1980, pp. 1-42.*
Osterweil, The Detention of Unexecutable Program Paths Through Static Data Flow Analysis, IP.com, May 31, 1977, pp. 1-26.*
Farzan Fallah et al., Observability Enhanced Coverage Analysis of C programs for Functional Validation, fetched on Feb. 13, 2015, pp. 1-6.*
Bogdan Korel et al., Assertion-Based Validation of Modified Programs, 2009, IEEE, pp. 426-435.*
Matthew B. Dwyer, Modular Flow Analysis for Concurrent Software, 1997, IEEE, pp. 264-273.*

* cited by examiner

```
boolean maybeValidator(String s) {
C1:     if (s.startsWith("a") && s.length == 1) {
L1:         return true;
        } else if (s.startsWith("b") && s.length > 1) {
            String suff = s.substring(1);
            boolean ret = !suff.contains("<");
L2:         return ret;
L3:     } else {
            return false;
        }
}
```

FIG. 1

STATIC ANALYSIS OF VALIDATOR ROUTINES

CROSS-REFERENCE TO RELATED APPLICATIONS

This disclosure is a continuation of application Ser. No. 13/109,170, filed May 17, 2011, U.S. Pat. No. 8,726,246 which is incorporated herein by reference in its entirety to provide continuity of disclosure.

BACKGROUND

This invention relates generally to static analysis of software programs, and, more specifically, relates to static analysis of validator routines.

Web applications are highly exposed to security attacks, as they are accessible by a large audience, and oftentimes accept a wide range of inputs as part of their functionality. The challenge of providing good service to benign users, while—at the same time—denying illegal requests is addressed by validator routines. These routines normally take an input coming from the user as their argument, and return a Boolean value indicating whether the value satisfies certain constraints. Note that this is not only important from a security perspective, but also to verify the integrity of the user-provided data. For example, the value of a parameter that is expected to represent a credit-card number needs to be verified, as the user may have used the wrong format.

The challenge of detecting validator routines in a sound, automated and accurate manner has received little attention so far. Instead, security algorithms, as well as commercial tools, tend to rely on a user-provided specification. The user classifies relevant methods as validators, and the ensuing analysis simply "believes" the specification to be correct, and treats values verified by a validator routine as safe and valid.

SUMMARY

A method includes accessing a validator routine having an input string and one or more return points, each return point returning a return value having two possible values; finding the return points in the validator routine; for each of the return points, performing a backwards traversal from a return point through a code section and determining constraints on the input string based at least on one or both of the two possible return values for the return point; using the determined constraints for the input string, determining whether all of the return values returned from the one or more return points meet validation constraints; and outputting one or more indications of whether all of the returned values returned from the return points meet the validation constraints for the one or both of the two possible return values. Apparatus and computer program products are also disclosed.

BRIEF DESCRIPTION OF THE SEVERAL VIEWS OF THE DRAWINGS

FIG. 1 is an example of a validator routine to be analyzed using a static analysis;

DETAILED DESCRIPTION

Figure 2:
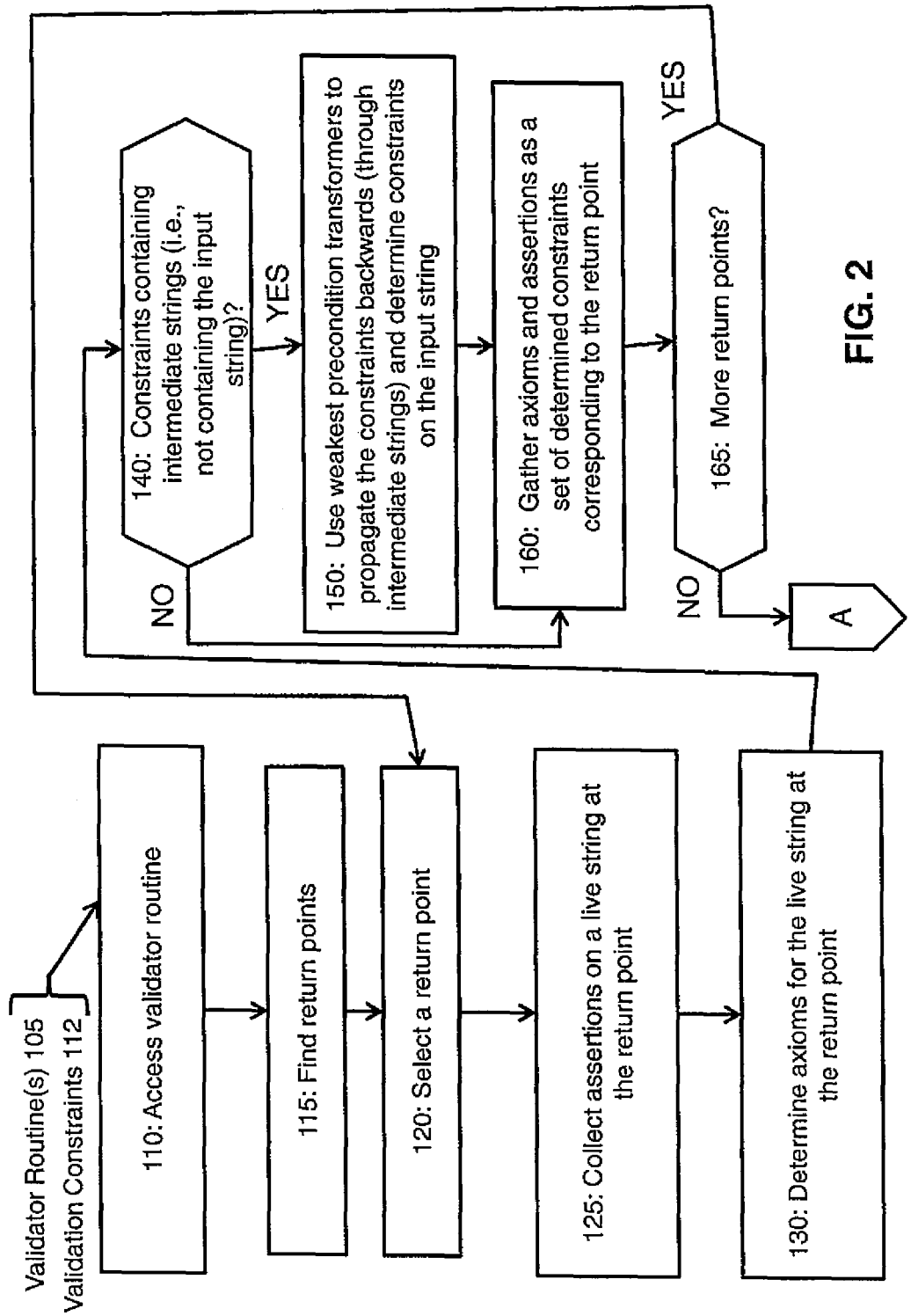
FIG. 2 is a flowchart of a method for static analysis of validator routines.
Figure 2:
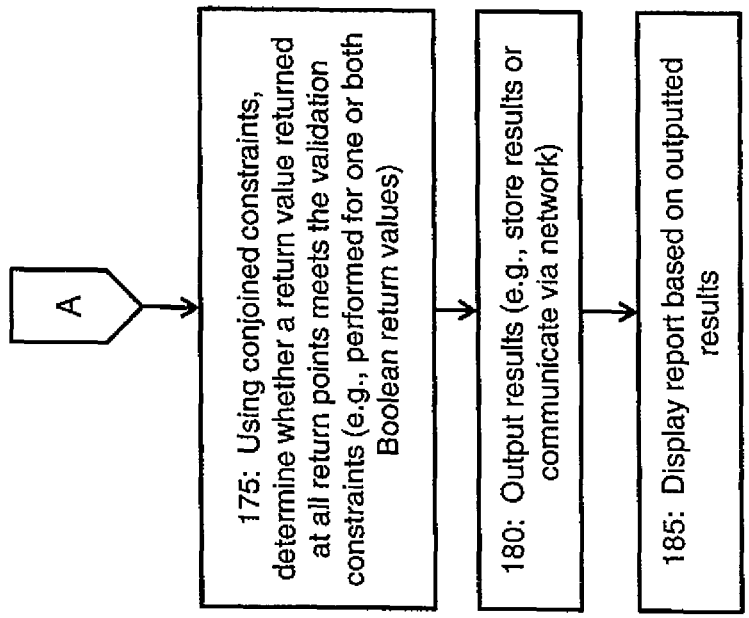

In contrast to the approaches previously described, an exemplary approach herein is sound, efficient and fully automated. In an exemplary embodiment, static analysis is performed on the validator routine candidate, and—based on backwards traversal from return points of the validator routine candidate—correlations are inferred between constraints on the input and the return value. To make this description more concrete, consider the example of a validator routine 100 shown in FIG. 1. This example validator routine 100 will be analyzed statically, that is without actual execution of the validator routine 100.

For simplicity, assume that the string s is benign from a security standpoint if s does not contain the character '<'. This is, indeed, one of the requirements for being safe against the notorious cross-site scripting (XSS) attack. Then the validator candidate 100, maybeValidator, indeed satisfies the relevant criterion: If the validator candidate returns "true", then the input string is guaranteed not to contain '<'. (The inverse does not necessarily hold for this example.) Details are given below of how an exemplary proposed analysis would come to this conclusion. Here, it suffices to give an intuitive description of the algorithm. The algorithm starts from the return points (labeled Li, 1<=i<=3), and collects assertions on live strings at these points. A live string is a string that is reachable from a local variable (via zero or more field dereferences). The assertions are translated into constraints on the input argument by backwards traversal: The algorithm advances backwards in an attempt to translate constraints on intermediate strings (e.g., suff) into constraints on the input argument (the strings in this example). Based on the set of assertion-to-return value constraints collected, the algorithm makes a judgment as to whether the validator candidate is indeed a validator.

A more detailed analysis is as follows. On the above example, the analysis being proposed starts at the return points (labeled Li, 1<=i<=3), and collects assertions on the "live" strings at these points. For example, the assertion at L3 is !(s.startsWith("a") && s.length == 1) && !(s.startsWith("b") && s.length > 1),
from which it is learned that
!(s.startsWith("a") && s.length == 1) && !(s.startsWith("b") && s.length > 1) ==> "false".

It is noted that the instant example is examining maybeValidator for what occurs when a return point returns true. In such an example, the return point L3 may not be examined, but can be examined to gather additional constraints on the input string. Additionally, validator routines can return either true or false in response to validator criteria (e.g., s does not contain the character '<') being met.

From L1, it is learned that s.startsWith("a") && s.length == 1 ==> "true",
which, combined with the axioms
s.startsWith("a") && s.length == 1 ==> s = "a"; and
s = "a" ==> !s.contains("<"), yields the desired conclusion that if this part of the validator candidate returns "true", then the input string is guaranteed not to contain '<'.

Finally, it is determined based on L2 that

```
!(s.startsWith("a") && s.length == 1) && s.startsWith("b") &&
s.length > 1 && !suff.contains("<") ==> "true"; and
    !(s.startsWith("a") && s.length == 1) && s.startsWith("b") &&
s.length > 1 && suff.contains("<") ==> "false".
```

Note, however, that the constraints for L2 are not yet fully resolved, since they refer to suff, which is not an input string. Thus, there is a need to propagate these constraints backwards, and infer relevant constraints on the input string, s. Doing so yields

```
!(s.startsWith("a") && s.length == 1) && s.startsWith("b") &&
s.length > 1 && !s.substring(1).contains("<") ==> "true"; and
    !(s.startsWith("a") && s.length == 1) && s.startsWith("b") &&
s.length > 1 && s.substring(1).contains("<") ==> "false".
```

This, combined with the axioms

```
    !s.startsWith("<") && !s.substring(1).contains("<") ==>
!s.contains("<"); and
        s.startsWith("b") ==> !s.startsWith("<"),
``` yields the desired conclusion that if this part of the validator candidate returns "true", then the input string is guaranteed not to contain '<'.

Now all the learned rules may be conjoined, and indeed the algorithm can verify that there is no string containing '<' for which "true" would be returned.

More formally, an exemplary approach is to compute a backwards analysis on a relational domain by mapping string constraints to Boolean return values. For this, the algorithm introduces weakest-precondition transformers when crossing over statements. For example, the weakest precondition for C1 is s="a". As the walk through the example above shows, axioms are used for simplification, as well as for enhanced inference power.

The result is an analysis that is 1) sound, 2) efficient, 3) accurate, and 4) fully automated. These properties are, of course, affected by the quality of the weakest-precondition transformers, but here there is a need to address a limited set of transformers—only those relating to assertions on strings and string operations—which provides the ability to model the concrete semantics in a very precise and specialized manner.

Turning now to FIG. 2, a flowchart is shown of a method for static analysis of validator routines. The method may be performed, e.g., by the system shown in FIG. 4. In block 110, the system accesses the validator routine 105 (an example of which is shown as validator routine 100 of FIG. 1). The validator routine can be any form of code including source code, object code, byte code, and the like. Validation constraints 112 may also be accessed in block 110. However, these constraints may also be built in, such as if the method of FIG. 2 is performed only on validators used to prevent XSS attacks. In block 115, the system finds the return points (e.g., Lx of FIG. 1) of the validator routine 105.

Blocks 120-165 can be considered, for each of the return points Lx, to perform a backwards traversal from a return point Lx through a code section corresponding to the return point, and to determine constraints on the input string based at least on one or both of two possible return values for the return point. That is, each return value can be a Boolean true or false. It is noted that a string is a finite sequence of symbols that are chosen from a set (e.g., an alphabet). However, the instant invention is also applicable to sequences. Differences between a set and a sequence include the following: (i) there is a total order on the elements in a sequence (i.e., for each pair x1, x2 of distinct elements, either x1<x2 or x2<x1); and (ii) an element can appear more than once in a sequence. This is important when it comes to strings, since a string is a sequence of characters. For instance, sequences enable the specification of illegal substrings—and not just characters or sets of characters—as part of the security policy (e.g., "script"), so it is less about absolute positions in the string, and more about the order in which characters may appear in a string (e.g., "csript" might be fine but "script" might not be though in both cases it is the same character set.

The constraints could be determined only for a return value of true, for instance, if this is the only Boolean value of concern. However, a validator is valid if whenever a string is malicious, the validator returns false. The validator is equally valid if whenever a string is malicious, the validator returns true. As long as the return value of the validator is the same for all malicious strings, the return value (for all return points Lx) can be either true or false. It is thus beneficial to account for both options, but in certain instances, only one option may be examined for values from return points. For instance, if a customer has stated that the candidate validator routine should return true whenever a string is malicious, then only the option of true need be checked for values from return points. It is noted that even if the customer has stated that the candidate validator routine should return a particular Boolean value whenever a string is malicious, the analysis may also use information from return points that return the other Boolean value to determine constraints on the input string.

In block 120, one of the return points is selected. In block 125, assertions on a live string at the selected return point are collected. The assertions are constraints on the input string. Note that a constraint on the input string is a constraint on some portion (from one to all symbols) of the input string. Examples of such assertions are presented above in reference to FIG. 1.

In block 130, axioms are determined for the live string at the selected return point. The axioms are also constraints on the input string. Examples of such axioms are presented above in reference to FIG. 1. In block 140, it is determined if there are any constraints that contain intermediate strings (that is, do not solely contain the input string). If so (block 140=YES), in block 150, weakest precondition transformers are used to propagate the constraints backwards (through the intermediate strings) and to determine constraints on the input string. Examples of this are described above in reference to FIG. 1. Further, as is known, a weakest precondition transformer is one type of predicate transformer and follows predicate transformer semantics. Briefly, given a statement S, the weakest-precondition transformer of S is a function mapping any postcondition R to a precondition. The result of this function, the function denoted wp(S,R), is the weakest precondition on the initial state ensuring that execution of the statement S terminates in a final state satisfying R. Use and determination of these types of transformers for program statements are known.

If there are no constraints that contain intermediate strings (block 140=NO) or block 150 has been performed, in block 160, the axioms and assertions are gathered as a set of determined constraints corresponding to the return point. In block 165, it is determined if there are additional return points. If so (block 165=YES), the method continues in block 120. If not, the method continues in block 175.

In block 175, using conjoined constraints, it is determined whether a return value returned at all return points meets the validation constraints. That is, the system reasons about each return statement Lx independently, and then conjoins all of the constraints. In the example of FIG. 1, there are two return statements L1, L2 that return true, so the system needs to check what can be asserted for each return statement to ensure that the validator routine 100 indeed performs appropriate validation across all possible code paths. It is noted that this could be performed for either or both of the possible Boolean return values of true or false. So, in the example of FIG. 1, the statements L1, L2 would be checked to determine whether validation constraints are met if each return statement returns true, whereas the statements L2, L3 would be checked to determine whether validation constraints are met if each return statement returns false in block 175.

In block 180, the results are output. That is, the results can be stored or communicated (e.g., to a customer) via a network. In block 185, the outputted results may also be displayed, if desired, to a user such as a customer and in a report.

Figure 3:
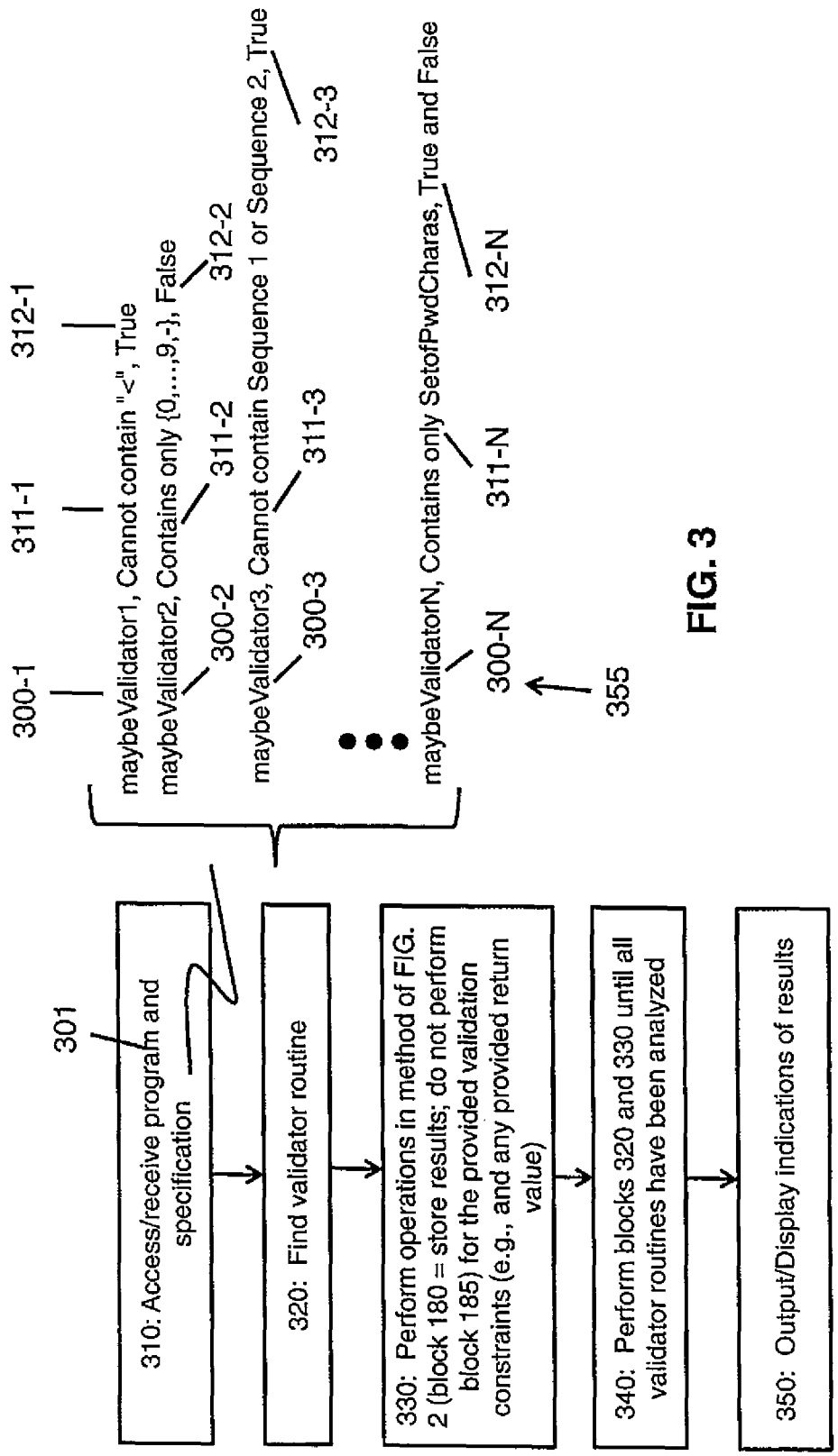
FIG. 3 is a flowchart of a method for providing static analysis of validator routines.

Referring now to FIG. 3, a flowchart is shown of a method for providing static analysis of validator routines. FIG. 3 may be performed as part of a service (e.g., where a customer sends a program to a server and the server performs the method in FIG. 3) or as a desktop application (e.g., where the customer installs the desktop application and runs the application on a program). In both cases, the instant invention would probably be used to either configure the analysis in an interactive fashion (i.e., the user clicks the "validator auto-detection" button and then reviews the results), or on-the-fly, when the static analysis is run. In this example, in block 310, a system accesses/receives a program and a specification, an example of which is shown as specification 355. In specification 355, there are indications 300-1 through 300-N of candidate validator routines. There are also indications 311-1 to 311-N of validation constraints. These examples have a validation constraint 311-1 for XSS (e.g., "Cannot contain '<'"), a validation constraint 311-2 for credit card input (e.g., "Contains only {0, . . . , 9, –}", a validation constraint 311-3 for an input where Sequence 1 or Sequence 2 are not allowed, and a validation constraint 311-N for a password (e.g., "Contains only SetofPwdCharas", where SetofPwdCharas contains indications of whatever a set of allowed password symbols could contain). Additionally, the specification 355 includes indications 312-1 to 312-N of what Boolean return value should be tested. That is, if an input string to maybeValidator2 (see indication 300-2) contains only the symbols zero through nine and the dash ("-"), the validation routine maybeValidator2 should return false. For the validation routine maybeValidatorN (see indication 300-N), the specification 355 requires testing of both true and false.

In block 320, a validator routine 105 corresponding to an indication 300 is found in the program 301. In block 330, the operations in the method of FIG. 2 are performed for the provided constraints in the indications 311. The results are typically stored in block 180 and are not displayed. In block 340, the blocks 320 and 330 are performed until all validator routines in the program 301 have been analyzed. In block 350, indications of the results are output and/or displayed.

Figure 4:
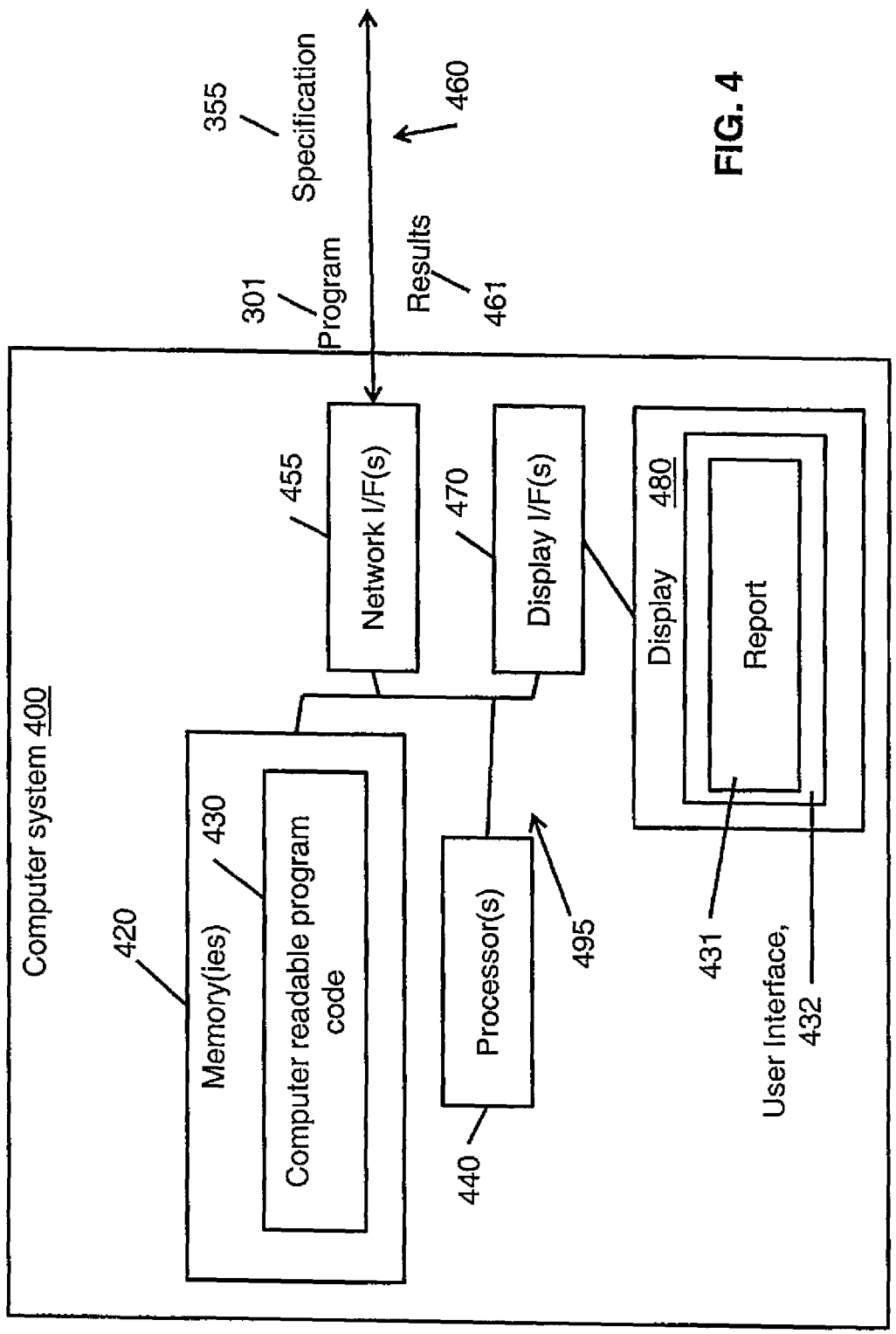
FIG. 4 is a block diagram of an exemplary system for performing the methods of FIGS. 2 and 3.

FIG. 4 is a block diagram of an exemplary system for performing the methods of FIGS. 2 and 3. The system in this example is a computer system 400 that includes one or more memories 420, one or more processors 440, one or more wired or wireless network interfaces 455, and one or more display interfaces 470, connected through one or more buses 495. The one or more memories 420 contain computer readable program code 430, which when executed by the one or more processors 440 cause the computer system 400 to perform one or more of the operations described herein. The display 480 is internal or external to the computer system 400. The display 480 displays a user interface 432 having a report 431 thereon. A link 460 transports results 461, which are indications of the results produced by methods of FIGS. 2 and 3. The link 460 may also be used to transport the program 301 and specification 355. It is noted that the computer system 400 could also be used by a customer, e.g., to send the program 301 and specification 355 to a server (i.e., another computer system 400) and receive results 461 suitable for creating the report 431.

Figure 5:
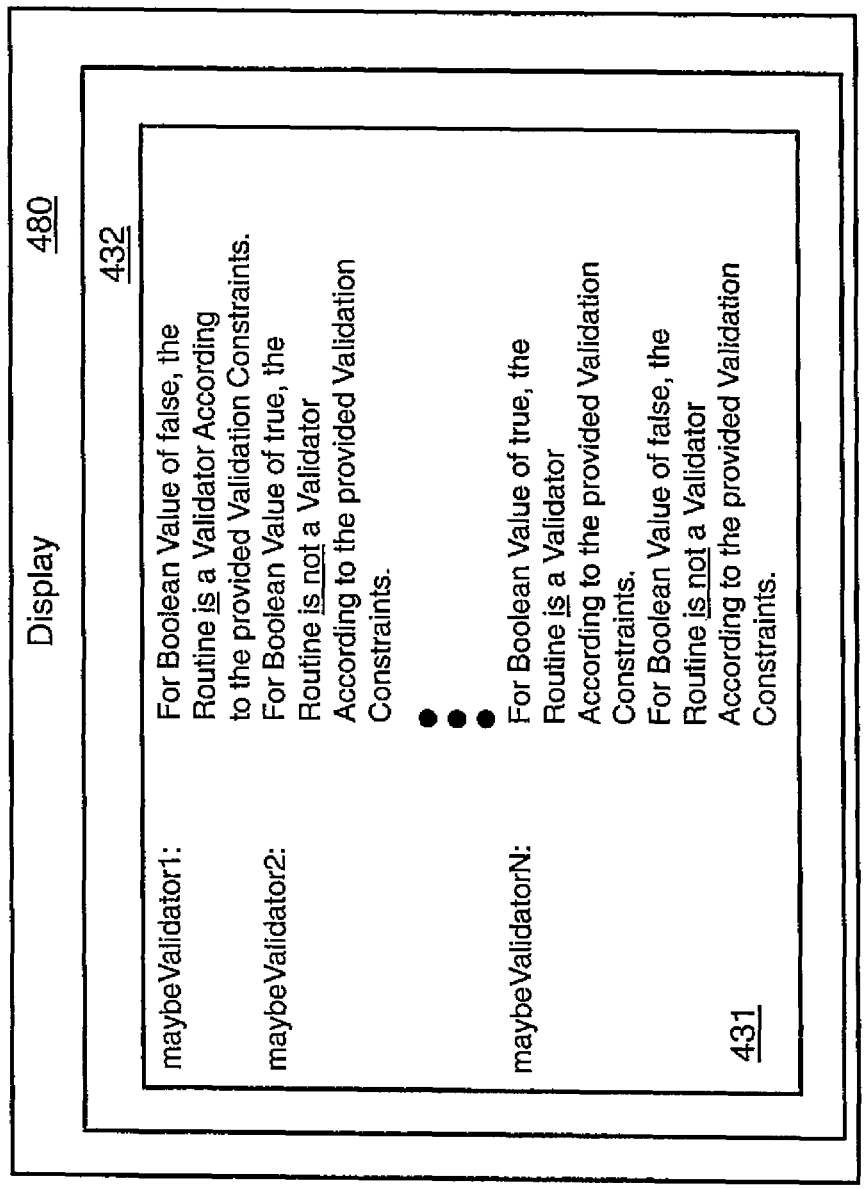
FIG. 5 is an example of a report produced by the method of FIG. 3 and displayed on a display of the system shown in FIG. 4.

FIG. 5 is an example of a report produced by the method of FIG. 3 and displayed on a display 480 of the system shown in FIG. 4. This example is an example of what a customer might see, e.g., when the customer sends the program 301 and the specification 355 to a server and the server performs the methods of FIGS. 2 and 3 and returns the results 461 to the user. This example corresponds to the specification 355. For each of the validator routines maybeValidator1 through maybeValidatorN, the report 431 in the user interface 432 contains indications for each of the tested Boolean return values (as indicated by corresponding indications 312) whether the validator routines meet corresponding validation constraints 112 (as defined by indications 311).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   accessing a validator routine having an input string and one or more return points, each return point returning a return value having two possible values, either true or false;
   finding the one or more return points in the validator routine;
   for each of the one or more return points, performing a backwards traversal from a return point through a code section corresponding to the return point and determining constraints on the input string based at least on one or both of the two possible return values for the return point, wherein in response constraints that contain intermediate strings, then the weakest precondition transformers are used to propagate the constraints backwards, and wherein the axioms and assertions are gathered as a set of determined constraints corresponding to the return point;
   using the determined constraints for the input string, determining whether all of the return values returned from the one or more return points meet one or more validation constraints for one or both of the two possible return values; and
   outputting one or more indications of whether all of the returned values returned from the one or more return points meet the validation constraints for the one or both of the two possible return values.

2. The method of claim 1, wherein the validation constraints comprise one or more indications of what set of symbols a string for the input string is not allowed to contain.

3. The method of claim 1, wherein the validation constraints comprise one or more indications of one or more sequences of symbols the input string is not allowed to contain.

4. The method of claim 1, wherein the validation constraints comprise one or more indications of what set of symbols a string for the input string is allowed to contain.

5. The method of claim 1, wherein:
   determining whether all of the return values returned from the one or more return points meet one or more validation constraints for one or both of the two possible return values further comprises determining whether all of the return values returned from the one or more return points meet the one or more validation constraints for one of a possible return value of true or false; and
   outputting further comprises outputting one or more indications of whether the returned values returned from the one or more return points meet the validation constraints for the one possible return value of true or false.

6. The method of claim 1, wherein:
   determining whether all of the return values returned from the one or more return points meet one or more validation constraints for one or both of the two possible return values further comprises determining whether all of the return values returned from the one or more return points meet the one or more validation constraints for both possible return values of true and false; and
   outputting further comprises outputting one or more indications of whether the returned values returned from the one or more return points meet the validation constraints for both the possible return values of true and false.

7. The method of claim 1, further comprising displaying the output one or more indications on a display.

8. An apparatus, comprising:
   one or more memories comprising computer readable program code;
   one or more processors, wherein the one or more processors are configured, in response to executing the computer readable program code, to cause the apparatus to perform the following:
      accessing a validator routine having an input string and one or more return points, each return point returning a return value having two possible values, either true or false;
      finding the one or more return points in the validator routine;
      for each of the one or more return points, performing a backwards traversal from a return point through a code section corresponding to the return point and determining constraints on the input string based at least on one or both of the two possible return values for the return point, wherein in response constraints that contain intermediate strings, then the weakest precondition transformers are used to propagate the constraints backwards, and wherein the axioms and assertions are gathered as a set of determined constraints corresponding to the return point;
      using the determined constraints for the input string, determining whether all of the return values returned from the one or more return points meet one or more validation constraints for one or both of the two possible return values; and
      outputting one or more indications of whether all of the returned values returned from the one or more return points meet the validation constraints for the one or both of the two possible return values.

9. The apparatus of claim 8, wherein the validation constraints comprise one or more indications of what set of symbols a string for the input string is or is not allowed to contain.

10. The apparatus of claim 8, wherein the validation constraints comprise one or more indications of one or more sequences of symbols the input string is not allowed to contain.

11. The apparatus of claim 8, wherein:
   determining whether all of the return values returned from the one or more return points meet one or more validation constraints for one or both of the two possible return values further comprises determining whether all of the return values returned from the one or more return points meet the one or more validation constraints for one of a possible return value of true or false; and
   outputting further comprises outputting one or more indications of whether the returned values returned from the one or more return points meet the validation constraints for the one possible return value of true or false.

12. The apparatus of claim 8, wherein:
   determining whether all of the return values returned from the one or more return points meet one or more validation constraints for one or both of the two possible return values further comprises determining whether all of the return values returned from the one or more return points meet the one or more validation constraints for both possible return values of true and false; and
   outputting further comprises outputting one or more indications of whether the returned values returned from the one or more return points meet the validation constraints for both the possible return values of true and false.

13. The apparatus of claim 8, further comprising a display and wherein the one or more processors are further configured, in response to executing the computer readable program code, to cause the apparatus to perform the following: displaying the output one or more indications on the display.

14. A computer program product, comprising:
   a non-transitory computer readable storage medium having computer readable program code embodied therein for use with a computer, when loaded into a computer configured to provide instructions to perform at least:
   accessing a validator routine having an input string and one or more return points, each return point returning a return value having two possible values, either true or false;
   finding the one or more return points in the validator routine;
   for each of the one or more return points, performing a backwards traversal from a return point through a code section corresponding to the return point and determining constraints on the input string based at least on one or both of the two possible return values for the return point, wherein in response constraints that contain intermediate strings, then the weakest precondition transformers are used to propagate the constraints backwards, and wherein the axioms and assertions are gathered as a set of determined constraints corresponding to the return point;
   using the determined constraints for the input string, determining whether all of the return values returned from the one or more return points meet one or more validation constraints for one or both of the two possible return values; and
   outputting one or more indications of whether all of the returned values returned from the one or more return points meet the validation constraints for the one or both of the two possible return values.

* * * * *